US 9,476,718 B2

(12) United States Patent
Herforth

(10) Patent No.: US 9,476,718 B2
(45) Date of Patent: Oct. 25, 2016

(54) GENERATING TEXT MESSAGES USING SPEECH RECOGNITION IN A VEHICLE NAVIGATION SYSTEM

(75) Inventor: Mirko Herforth, Hamburg (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 951 days.

(21) Appl. No.: 11/775,450

(22) Filed: Jul. 10, 2007

(65) Prior Publication Data

US 2008/0133230 A1   Jun. 5, 2008

(30) Foreign Application Priority Data

Jul. 10, 2006   (EP) .................................... 06014254

(51) Int. Cl.

| G10L 15/26 | (2006.01) |
| G01C 21/26 | (2006.01) |
| H04L 12/58 | (2006.01) |
| H04M 1/725 | (2006.01) |

(52) U.S. Cl.
CPC .............. *G01C 21/26* (2013.01); *G10L 15/26* (2013.01); *H04L 12/5835* (2013.01); *H04L 51/066* (2013.01); *H04M 1/72552* (2013.01); *H04L 12/5895* (2013.01)

(58) Field of Classification Search
CPC ....... G10L 13/00; G10L 15/00; G10L 15/26; G10L 2015/086; G01C 21/3608; H04M 1/72552
USPC ............ 704/231, 235, 251, 270, 270.1, 254; 379/88.01, 88.16; 455/466; 701/488
See application file for complete search history.

(56) References Cited

U.S. PATENT DOCUMENTS

| 5,848,389 | A  | * | 12/1998 | Asano et al. .................. 704/239 |
| 6,081,780 | A  | * | 6/2000  | Lumelsky ...................... 704/260 |
| 6,108,631 | A  | * | 8/2000  | Ruhl ............................. 704/270 |
| 6,173,266 | B1 | * | 1/2001  | Marx et al. .................... 704/270 |
| 6,415,021 | B1 | * | 7/2002  | Oh .............................. 379/88.13 |
| 6,507,643 | B1 | * | 1/2003  | Groner .......................... 704/231 |
| 6,625,257 | B1 | * | 9/2003  | Asaoka et al. ............. 379/88.01 |

(Continued)

FOREIGN PATENT DOCUMENTS

| EP | 00901000 A2 | 3/1999 |
| GB | 02389761 A1 | 12/2003 |

(Continued)

OTHER PUBLICATIONS

Lind et al., "The Network Vehicle—A Glimpse into the Future of Mobile Multi-Media", IEEE Aerospace and Electronics Systems Magazine, vol. 14, No. 9, Sep. 1999.

(Continued)

*Primary Examiner* — Martin Lerner
(74) *Attorney, Agent, or Firm* — Artegis Law Group, LLP

(57) ABSTRACT

A vehicle navigation system may send and receive communications, such as text messages. Speech recognition may generate a text message without affecting a driver's control of the vehicle. A user may audibly control the navigation system and generate a text message through a speech recognition element. A microphone may record a user's voice, which is then transformed into a text message for transmission. The message may be recorded sentence-by-sentence, word-by-word, or letter-by-letter. The recorded text message may be visually or audibly presented to the user before transmission.

16 Claims, 7 Drawing Sheets

(56) References Cited

U.S. PATENT DOCUMENTS

| | | | |
|---|---|---|---|
| 6,826,472 B1* | 11/2004 | Kamei et al. | 701/202 |
| 6,934,552 B2* | 8/2005 | Holley et al. | 455/466 |
| 6,965,863 B1* | 11/2005 | Zuberec et al. | 704/270 |
| 7,243,067 B1* | 7/2007 | Weinmann et al. | 704/231 |
| 7,616,943 B2* | 11/2009 | Oesterling | 455/412.1 |
| 2002/0082030 A1* | 6/2002 | Berndt et al. | 455/466 |
| 2003/0028379 A1* | 2/2003 | Wendt et al. | 704/260 |
| 2003/0125950 A1* | 7/2003 | Avila | G06Q 10/107 704/260 |
| 2003/0157968 A1* | 8/2003 | Boman | H04M 1/72547 455/563 |
| 2003/0200096 A1* | 10/2003 | Asai | G10L 15/26 704/275 |
| 2004/0019488 A1* | 1/2004 | Portillo | 704/275 |
| 2005/0086310 A1* | 4/2005 | Kamdar et al. | 709/206 |
| 2005/0266831 A1* | 12/2005 | Roth | G10L 19/0018 455/412.1 |
| 2006/0085115 A1 | 4/2006 | Ilan et al. | |
| 2007/0042812 A1* | 2/2007 | Basir | H04M 1/6091 455/569.2 |
| 2007/0112571 A1* | 5/2007 | Thirugnana | H04M 1/274516 704/270 |
| 2007/0260456 A1* | 11/2007 | Proux | H04M 1/72552 704/235 |

FOREIGN PATENT DOCUMENTS

| | | |
|---|---|---|
| GB | 02420060 A1 | 5/2006 |
| GB | 2420674 | 5/2006 |
| GB | 02420674 A1 | 5/2006 |
| JP | 2006151065 | 6/2006 |
| WO | 03077234 | 9/2003 |
| WO | WO 03077234 A1 | 9/2003 |

OTHER PUBLICATIONS

Hoogenboom et al., "Quantifying the Market Demand for In-Vehicle Telematics Internet Services", British Telecommunications Engineering, vol. 18, No. SPEC. ISS. 02, Aug. 1999.

European Examination Report, EPO Application No. 06 014 254.4 dated Apr. 15, 2013.

* cited by examiner

GENERATING TEXT MESSAGES USING SPEECH RECOGNITION IN A VEHICLE NAVIGATION SYSTEM

BACKGROUND OF THE INVENTION

1. Priority Claim

This application claims the benefit of priority from European Patent Application No. 06014254.4, filed on Jul. 10, 2006, which is incorporated by reference.

2. Technical Field

This application relates to a navigation system with speech recognition that is configured to send and receive text messages.

3. Related Art

A navigation system in a vehicle may analyze data provided by GPS (Global Positioning System), motion sensors, such as ABS wheel sensors and digital maps to determine the current position and velocity of a vehicle. The navigation system may receive communications, such as the GPS data, or updated digital maps. The navigation system may receive and process broadcasted information, such as traffic information, or vehicle information, such as information on the position of the vehicle. Some systems are restricted in their communication capacity.

Navigation systems may not be optimized to communicate with other systems. The environment or location of use may not facilitate communication. For example, a driver may not be able to communicate easily because the driver's attention is focused on driving the vehicle. The driver may not be able to communicate textually because manually editing a message may distract the driver. Therefore, a need exists to provide an improved communication means in a navigation system which will not impair a driver's ability to drive the vehicle safely.

SUMMARY

A vehicle navigation system may send and receive communications, such as text messages. Speech recognition may generate a text message without affecting a driver's control of the vehicle. A user may audibly control the navigation system and generate a text message through a speech recognition element. A microphone may record a user's voice, which is then transformed into a text message for transmission. The message may be recorded sentence-by-sentence, word-by-word, or letter-by-letter. The recorded text message may be visually or audibly presented to the user before transmission.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
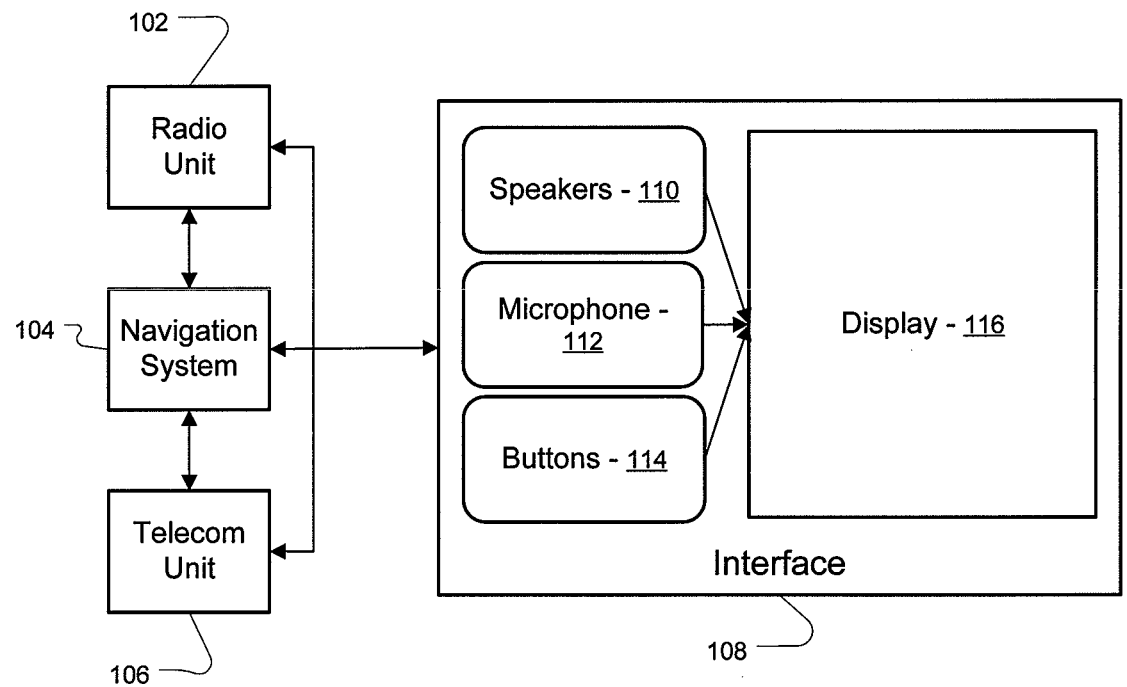
FIG. 1 is a block diagram of a vehicle interface.

FIG. 1 is a block diagram of a vehicle interface 108. The vehicle may include an automobile, such as a car, truck, or motorcycle, or may include any device for transporting people or things. The interface 108 may comprise speakers 110, a microphone 112, buttons 114, and a display 116. The interface 108 is coupled with a radio unit 102, a navigation system 104, and a telecommunications unit 106. The interface 108 allows a user to provide input or receive output from any of the radio unit 102, navigation system 104, or telecom unit 106.

The speakers 110 provide an audible output within the vehicle. For example, a user may play compact discs (CD's) or listen to the radio through the speakers. The speakers may provide an audible output from the navigation system 104, such as presenting a message audibly. The speakers 110 or any other component from the interface 108 may be a part of the vehicle console, disposed in the vehicle dashboard, or otherwise positioned within the vehicle either as part of the vehicle or as a separate component. Alternatively, an earphone or a hands-free device may be used rather than or in addition to speakers that are directly integrated into the vehicle.

The microphone 112 may receive an audio input (referred to as speech, a speech input or a speech signal) from the user. The driver of the vehicle or another who may interact with the navigation system may be referred to as the user. There may be multiple microphones 112 which receive a speech signal. When the user speaks into the microphone 112, the speech may be recorded, stored, and processed. The microphone 112 may be embedded within the vehicle, such as in the steering wheel, where it may receive the audio signals from a user's voice. Multiple microphones 112 may be positioned in the passenger compartment of a vehicle to detect a passenger's speech. Microphones 112 may be located in the vicinities of the respective passenger seats. Microphone arrays may be used including one or more directional microphones arranged to improve the quality of the received signal.

The navigation system 104 may include a Bluetooth interface and/or a wide local area network (WLAN) interface to improve the variability and functionality of the speech input. The driver may carry a headset or hands-free device linked to the navigation system 104 through a wireless protocol, such as Bluetooth technology. In these systems, the receiver may be positioned is close to the user's mouth, so the quality of the speech signal to be recognized is improved.

The buttons 114 are examples of further input devices in the interface 108. The buttons 114 may comprise knobs, levers or other adjustment devices. For example, the volume of the speakers 110 may be adjusted by turning an adjustable knob. Additionally, a push-to-speak button may turn on and turn off the microphone 112, or may notify the navigation system 104 when to expect a speech signal.

The display 116 is configured to display information to the user. For example, the display 116 may present maps and directions from the navigation system 104. The display 116 may include the time, or a radio station, CD, or MP3 that is played through the speakers 110. The display 116 may show received messages from the telecom unit 106, or show outgoing messages from the user's speech that are received by the microphone 112. The display 116 may comprise a touch screen allowing further interaction from the user. For example, the user may be able to modify or alternate the maps that are displayed from the navigation system 104.

The radio unit 102 may comprise an electronic circuit or device used to select signals for amplification and conversion into sound. The radio unit 102 may transmit and receive radio signals as one form of communication. For example, the radio unit 102 may receive amplitude modulated (AM) or frequency modulated (FM) signals.

The telecom unit 106 may connect to a telephone or wireless network that may transmit or receive data over a network. The telecom unit 106 may communicate over a wireless fidelity (Wi-Fi) network, short messaging service (SMS) network, or a wide area network (WAN), that may interface one or more interconnected networks that make up the Internet. The wireless network may be a cellular telephone network, a network operating to a protocol such as IEEE 802.11, 802.16, 802.20, or WiMax network. The network may utilize a variety of networking protocols now in use or later developed including, but not limited to TCP/IP based networking protocols.

Figure 2:
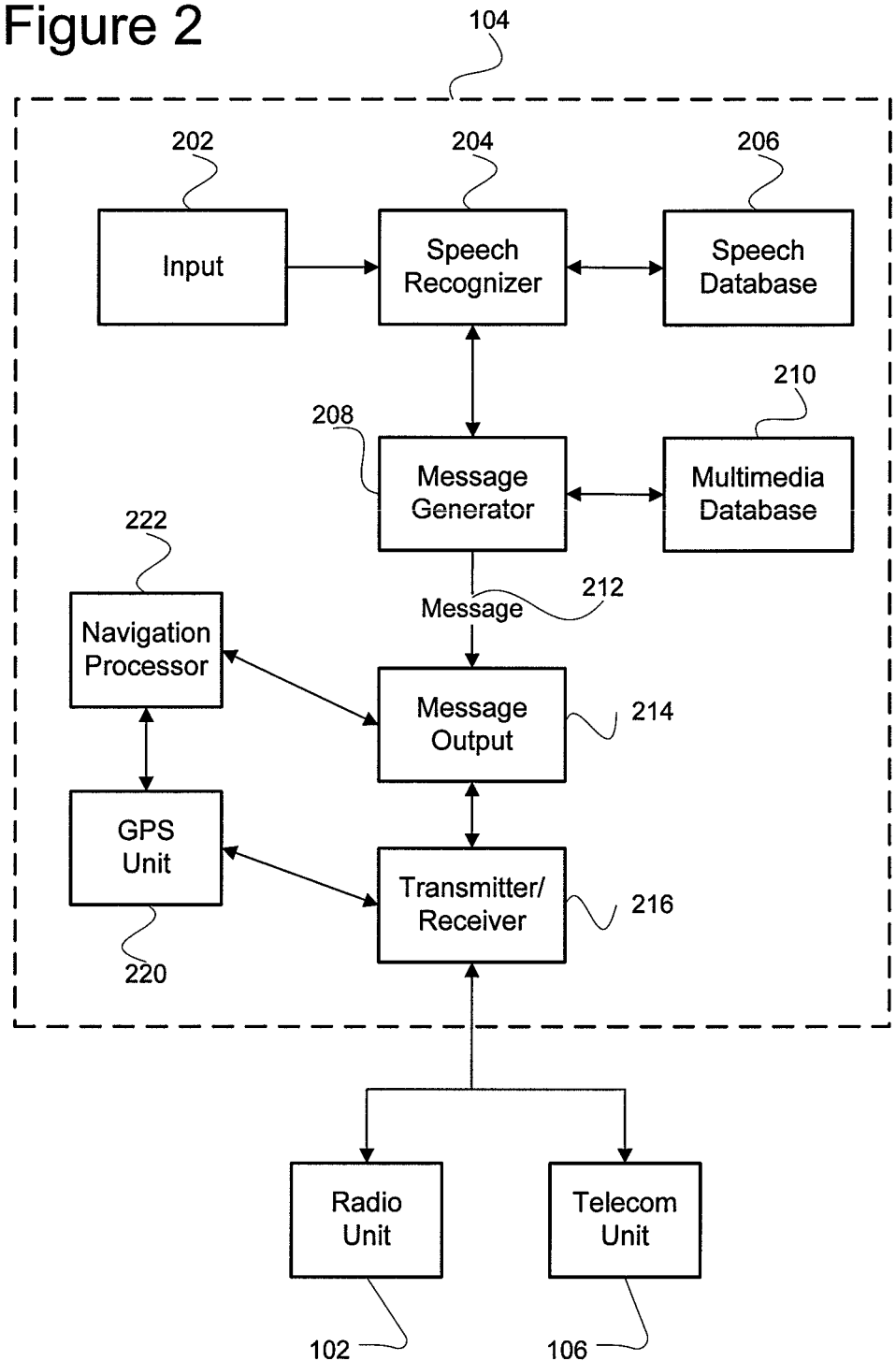
FIG. 2 is a block diagram of a navigation system.
Figure 3:
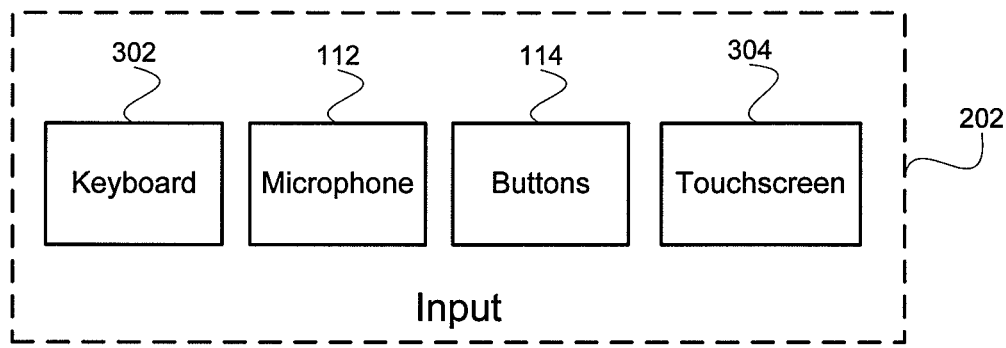
FIG. 3 is a block diagram of an input to the navigation system.

FIG. 2 is a block diagram illustrating the navigation system 104. The navigation system 104 receives data through an input 202. In FIG. 3, the input 202 may receive or comprise audio data (a speech signal), received through microphone 112, or may include other data from the buttons 114 or through the display 116 if it includes a touchscreen 304. The navigation system 104 may interface through a keyboard 302 or keypad, such as on the touchscreen 304 through which a user may type a message. In some systems, the keyboard 302 may not be a accessed by a driver.

The spoken words received by the microphone 112 are passed to a speech recognizer 204. When a user speaks into the microphone 112, that audio data may be described as a speech signal or speech input. The speech recognizer 204 processes the received speech signal from the microphone 112 to determine its content. The speech that is recorded or received at the microphone 112 and into the speech recognizer 204 may be detected in sentence form, word form, or letter form. The user may speak in complete sentences, or may talk at a slower word-by-word, or letter-by-letter rate. In noisy environments (such as driving at high speeds), or for someone with an accent that is difficult for the speech recognizer 204 to interpret, the user may speak letter-by-letter. In the letter-by-letter mode the user is expected to spell a word letter-by-letter, and in the word-by-word mode pauses after each spoken word are used to distinguish words. The letter-by-letter mode may be more time consuming, but may be more reliable. The user may be given the option of selecting the mode of speech recognition.

Figure 4:
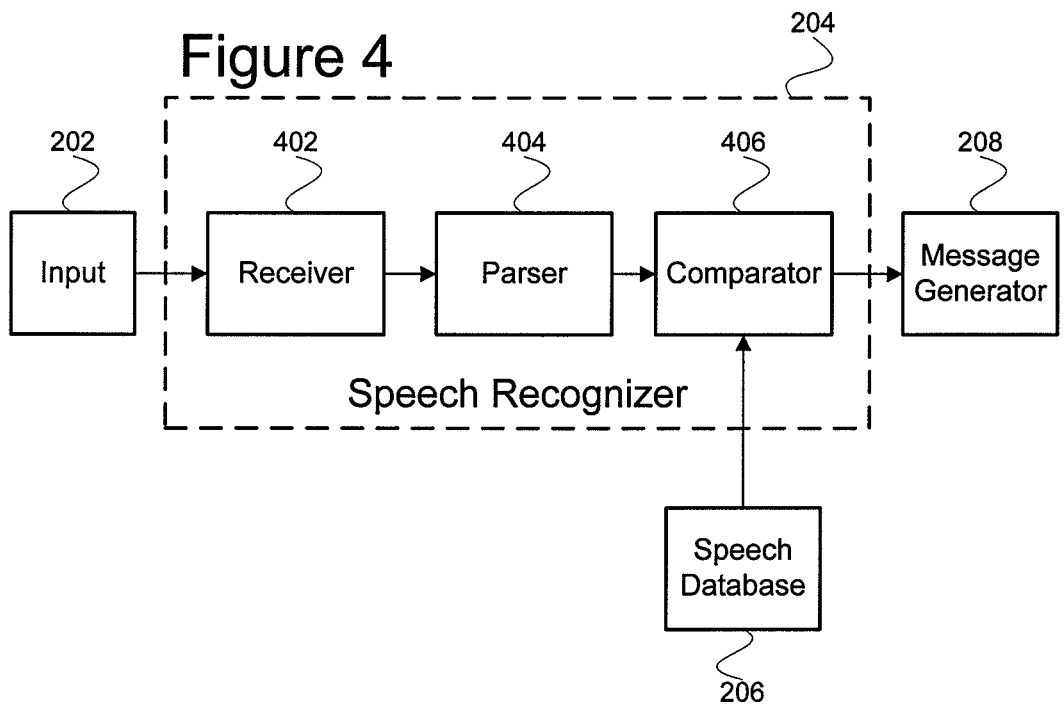
FIG. 4 is a block diagram of a speech recognizer of the navigation system.

FIG. 4 is a block diagram further illustrating the speech recognizer 204. The speech recognizer 204 may comprise a receiver 402, a parser 404, and a comparator 406. The receiver 402 communicates with the input 202 to receive a speech signal from the user. The receiver 402 and/or the input 202 may be coupled with the microphone 112 or other input device for receiving the message from the user.

The parser 404 communicates with the receiver 402 to identify the sentences, words or letters from the speech signal received from the receiver 402. If the speech is recited word-by-word, the parser 404 identifies the spaces between words. Likewise, if the speech is recited letter-by-letter, the parser 404 identifies the spaces between letters. The parsed speech is then passed from the parser 404 to the comparator 406 for identifying the words or letters of the speech.

The comparator 406 may access a speech database 206, which includes samples of spoken letters, words, and phrases. The speech samples stored in the speech database 206 may be compared with the speech from the user in determining what was said by the user. Comparison of the analyzed speech input with the stored speech samples is performed by the comparator 406. The comparator 406 may process the speech based on stored sounds or phonics rather than entire words. The determined words or phrases with the best fitting speech sample are then passed to a message generator 208. In one system, the parser 404 may be unnecessary and may be part of the comparator 406.

The speech recognition from the speech recognizer 204 may utilize probability estimates or other reliability evaluations of the recognition results. The estimates may be assigned to the recognition results that may, e.g., be generated in form of N-best lists comprising candidate words that are compared or identified by the comparator 406. If the reliability evaluations for one speech recognition mode fall below a predetermined threshold the recognition process may be repeated by a different mode. The digitized speech signal is analyzed for the recognition process by using feature (characteristic) vectors comprising feature parameters which may be extracted from the bandlimited signals. The recognizer deduces feature vectors comprising characteristic parameters as cepstral coefficients from the digitized speech signal. The wideband spectral envelope, formants, the pitch and short-time power spectrum, etc., may be determined to facilitate the recognition process.

Speech recognition may utilize concatenation of allophones that constitute a linguistic word. The allophones may be represented by Hidden Markov Models (HMM) that are characterized by a sequence of states each of which has a well-defined transition probability. In order to recognize a spoken word, the speech recognition system computes the more likely sequence of states through the HMM. This calculation may be performed by the Viterbi algorithm, which iteratively determines the more likely path through the associated trellis. The estimate for an orthographic representation of a spoken word or sentence that corresponds to sampled acoustic signals may be chosen from a finite vocabulary of words that can be recognized, such as by the comparator 406. In one example, the vocabulary is stored in the form of data lists in the speech database 206.

The message generator 208 receives the recognized speech from the speech recognizer 204 and produces the completed message. The message generator 208 may be a component of the speech recognizer 204, or the speech recognizer 204 may be a component of the message generator 208. The message generator 208 receives the interpreted/recognized speech and produces a message 212. The message 212 may comprise additional attachments or multimedia from the multimedia database 210, which is coupled with the message generator 208. The multimedia database 210 may be an exterior data volume, e.g., a CD or a DVD, or may be a hard disk installed in the navigation system 104.

Figure 5:
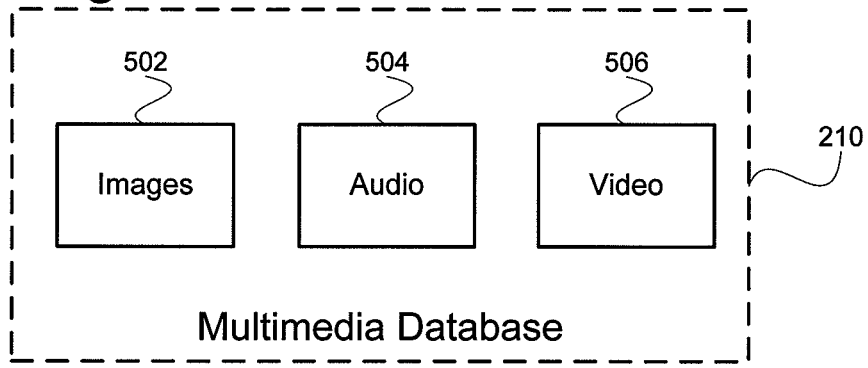
FIG. 5 is a block diagram of a multimedia database in the navigation system.

In FIG. 5, the multimedia database 210 may comprise images 502, audio 504, or video 506. The video 506 may comprise MPEG files and/or AVI (Audio Video Interleaved) files. The image 502 may comprise JPEG files and/or vector graphics and/or bitmaps. The audio 504 may comprise MP3, advanced audio coding (AAC), WAV and/or windows media audio (WMA) files.

Any file, data string, or record from the multimedia database 210 may be attached to or embedded in the message 212. If the message 212 is an email, a video 506 may be part of an attachment. If the message 212 is generated through multimedia messaging system (MMS), an audio stream, such as an MP3 file, may be part of the message 212. In one system, the audio 504 that is stored in the multimedia database 210 may become the speech into the input 202, which is converted into message text. For example, an MP3 voice clip may be passed through the speech recognizer 204 to generate a message that includes text of the speech from the recorded voice clip. In one system, the driver may append a particular MP3 to a message, by an utterance of the text of an ID3 (identifying an MP3) tag that is tagged to the MP3 file.

Figure 6:
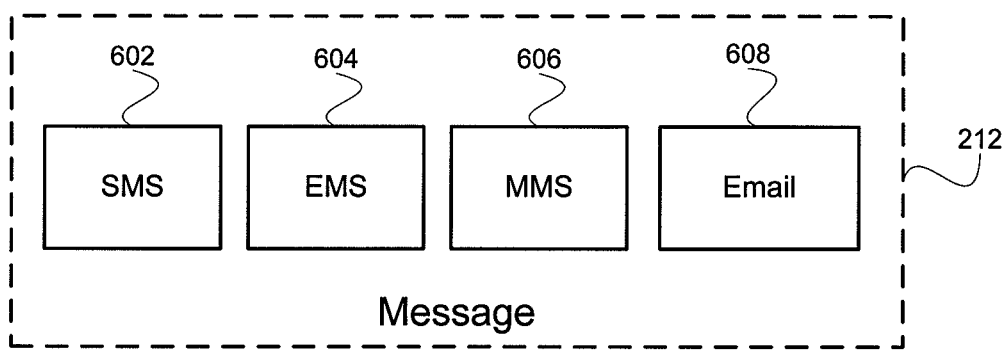
FIG. 6 is a block diagram of a message in the navigation system.

In FIG. 6, the message 212 may comprise a short messaging service (SMS) message 602, an enhanced messaging service (EMS) message 604, a multimedia messaging service (MMS) message 606, or an email message 608. The message 212 may be transmitted through any store and forward based messaging systems such as SMS 602, EMS 604, MMS 606 messaging, or electronic mail 608 or other forms of messaging, such as peer to peer based or direct messaging systems, e.g. instant messaging. SMS 602 messages may be a text message. SMS 602 may be used to send text messages between mobile telephones over a wireless network, such as GSM, TDMA and CDMA networks. EMS 604, which may be similar to SMS, may be used to send a textual formatted message. An EMS message 604 may comprise animations, pictures, icons, or sounds. MMS 606, which may be similar to SMS, may include multimedia elements, such as images, audio or video, with the message. An MMS 606 message may have rich text formatting. Email 608 may not be limited by the network, and utilizes addresses to identify a sender and a receiver. Email 608 may be sent over a variety of networks, including the Internet.

Figure 7:
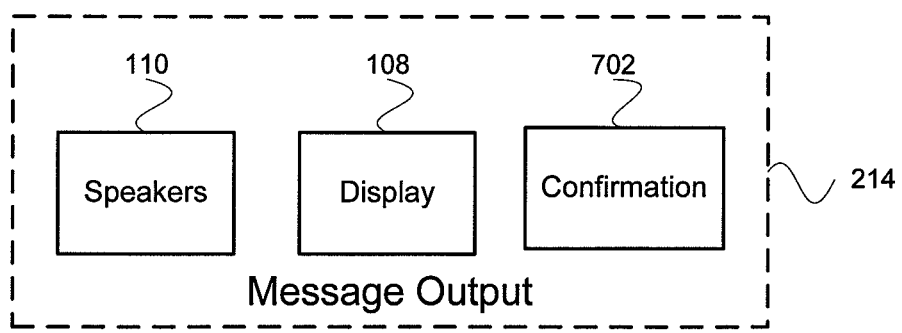
FIG. 7 is a block diagram of a message output from the navigation system.

The message generator 208 may communicate with a message output 214. The message output 214 may provide an audible or visual output. In FIG. 7, the message output 214 may comprise the speakers 110, the display 108, and/or a confirmation unit 702. The display 108 may output the message 212 prepared by the message generator 208. Alternatively, the speakers 110 may audibly alert or present the message. The message presentation may be detected by the confirmation unit 702 to verify that the message generated by the message generator 208 is the same as the speech spoken by the user. If the message varies, the user may be allowed to modify the message. The user may request to change the message through an audio or physical interface (e.g. spoken keyword, such as "correction"). When the message is verified by the confirmation unit 702, it may be transmitted.

The transmitter/receiver 216 communicates with the message output 214 to transmit the message 212 to its destination. The transmitter/receiver 216 may receive an incoming message that is then presented to the user by the message output 214. The transmitter/receiver 216 may connect with the radio unit 102, telecom unit 106, or other network server or communication port (not shown) to send and receive data.

The message may be transmitted as a radio signal by the radio unit 102, or transmitted on a wireless network through the telecom unit 106.

The message may be transmitted to a remote party with a receiving means, such as a radio receiver. The remote party may be located outside the car. Alternatively, the message may be transmitted from the driver or a front passenger to a back passenger and displayed on a display installed in the back of the vehicle. For example, in transportation vehicles such as buses, such as system may allow a driver to communicate with the passengers.

The navigation system 104 may comprise a global positioning system (GPS) unit 220 in communication with a navigation processor 222. The GPS unit 220 may determine the location of the vehicle which is used for giving navigation directions on a map, which are determined by the navigation processor 222. The navigation processor 222 may communicate with the message output 214, such as the display 108 or the speakers 110 to provide navigation directions. The directions and maps from the navigation processor 222 may be transmitted through the speakers 110 or displayed on the display 108. The GPS unit 220 may communicate with the transmitter/receiver 216 for receiving and sending information, such as the GPS location of the vehicle. The GPS information may be transmitted with the radio unit 102, the telecom unit 106, or a different GPS server (not shown). In one system, the telecom unit 106, the radio unit 102 and the transmitter/receiver 216 may comprise one device configured for communication outside of the vehicle.

Figure 8:
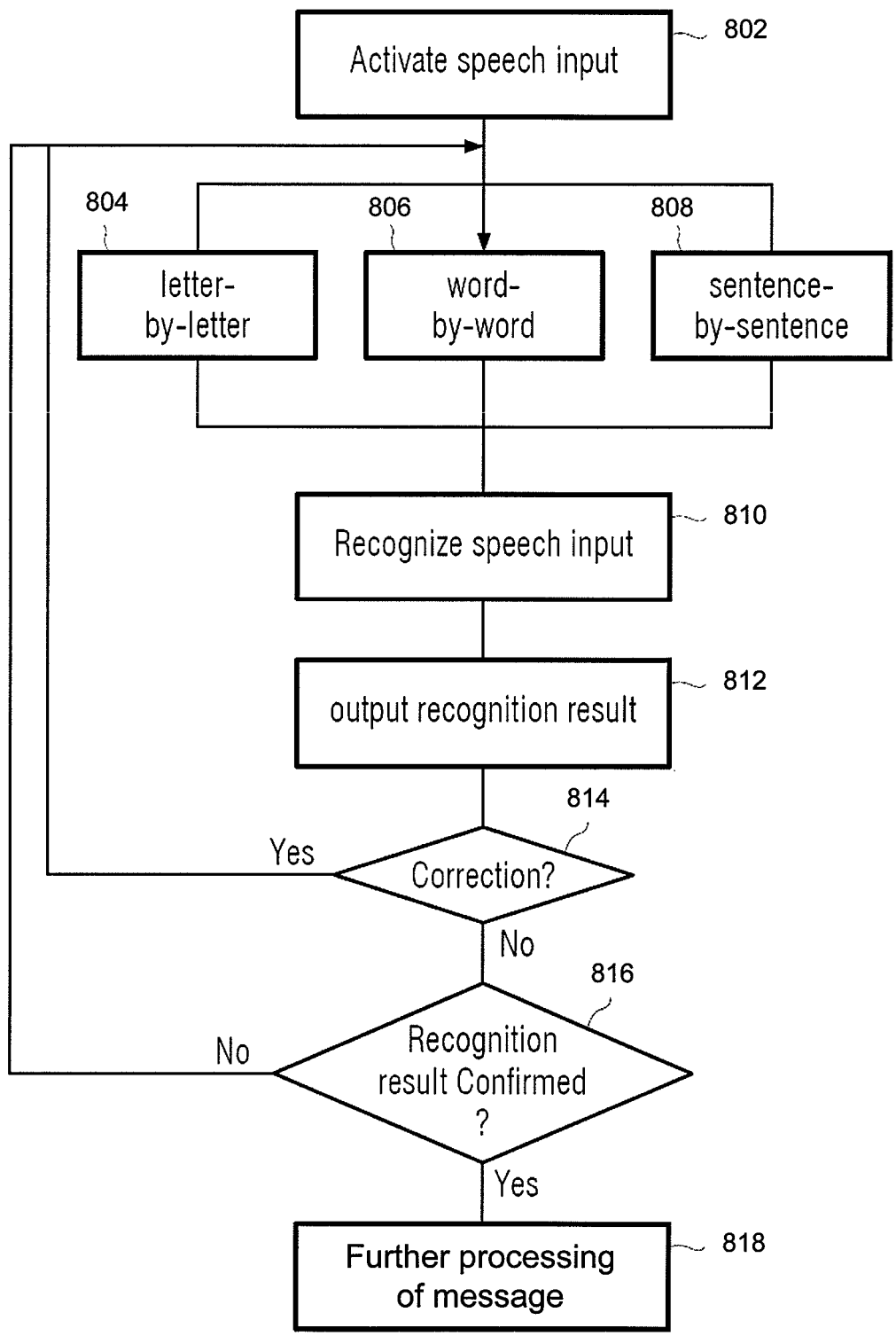
FIG. 8 is a process of transmitting a message.

FIG. 8 illustrates the receipt of a message from a user's speech. At block 802, the speech input is activated. The speech input may be received through the microphone 112 or microphone array. The activation of the speech input may be from one of the buttons 114, such as a push-to talk lever, or from an option on the display, if it is touchscreen. When the speech input is activated, the navigation system 104 may receive the speech signals that determines the text of the message. For example, the user may utter the keyword "SMS" followed by "Dear XY, I will be about 20 minutes late." The utterance is detected by the microphone(s) 112. If the user wants to insert an image 502 in the message to be sent to XY, he/she may use the keyword "EMS" or "MMS" instead of "SMS."

When the speech input is activated at block 802, the navigation system 104 determines the type of input (speech) received. The input may be recognized by different modes, such as a letter-by-letter process at block 804, a word-by-word process at block 806, or a sentence-by-sentence process at block 808. In some systems, all three modes of speech recognition are provided. Some systems provide the user with the possibility to choose one of these modes in accordance with the actual circumstances. The activation of the speech input in block 802 may include an option by which the user establishes which type of speech the user will be speaking.

At block 810, the speech input is recognized, such as by the speech recognizer 204 and the message is generated, such as by the message generator 208. The speech recognition compares each analyzed sound, word, letter, or sentence with speech samples stored in the speech database 206. A message is generated based on the character strings or word strings that are identified by the speech recognizer 204.

The message is output at block 812 to confirm the text of the message. For example, after a user's utterance, such as the keyword "SMS" followed by "Dear XY, I will be about 20 minutes late" the navigation system 104 may output a recognition result for confirmation. The navigation system 104 may produce a synthesized verbal utterance of the recognized speech input through the speakers 110, e.g., "Text of SMS: Dear XY, I will be about 20 minutes late." Alternatively, the text of the message may be displayed on the display 116. The user may verify the recognized text, e.g., by utterance of the keyword "correct" or by pressing the appropriate confirmation button.

Subsequently, the user may instruct the navigation system 104 to insert multimedia into the message to be sent. The navigation system 104 may anticipate an instruction for inserting an audio, image or video file after the keyword "correct" and assuming the user has asked for an EMS or MMS message by the corresponding keyword. The user may then instruct "Insert image 'zz'" where the file to be inserted is identified by "zz." The image file is loaded from the multimedia database 210.

If there is a correction to the generated message at block 814, the process repeats to one of blocks 804, 806, or 808 to correct the message. A user may ask for a correction by issuing a spoken command, such as "false," so that the process repeats. Other recognizing modes may be used (e.g., by the letter-by-letter mode rather than the word-by-word mode). Word candidates from N-best lists may be used to correct errors. Alternatively, the user may be prompted to repeat the speech input.

In one system, the generated message may be evaluated by a score. If the score falls below a predetermined threshold, the processing of the speech input may be repeated in order to obtain a more accurate message. The repeating may utilize a different mode, such as the letter-by-letter basis in block 804, the word-by-word basis in block 806 or the sentence-by-sentence basis in block 808. The result may be evaluated and processing may be repeated in the third mode (e.g., on a letter-by-letter basis when the first two processing operations have been performed on a sentence-by-sentence and word-by-word basis, respectively). If processing of the speech signal is performed on a word-by-word basis as in block 806, each recognized word may be assigned a candidate word score. Processing may also be performed automatically in all three modes and the generated message with the highest score (obtained by utilizing one of the sentence-by-sentence, word-by-word basis and letter-by-letter basis) may be output for further processing.

If the message is confirmed to be correct by the user in block 814, the navigation system may ask whether or not the message is completed as in block 816. Confirmation of the end of the message may be identified by a keyword, such as "finished." If the user does not confirm the message in block 816, then the navigation system 104 again waits for further speech input from the user. If the message is confirmed in block 816, then the message may be further processed in block 818. The further processing may comprise the transmission of the message by the transmitter/receiver 216. Alternatively, the message may be stored for a later transmission.

Figure 9:
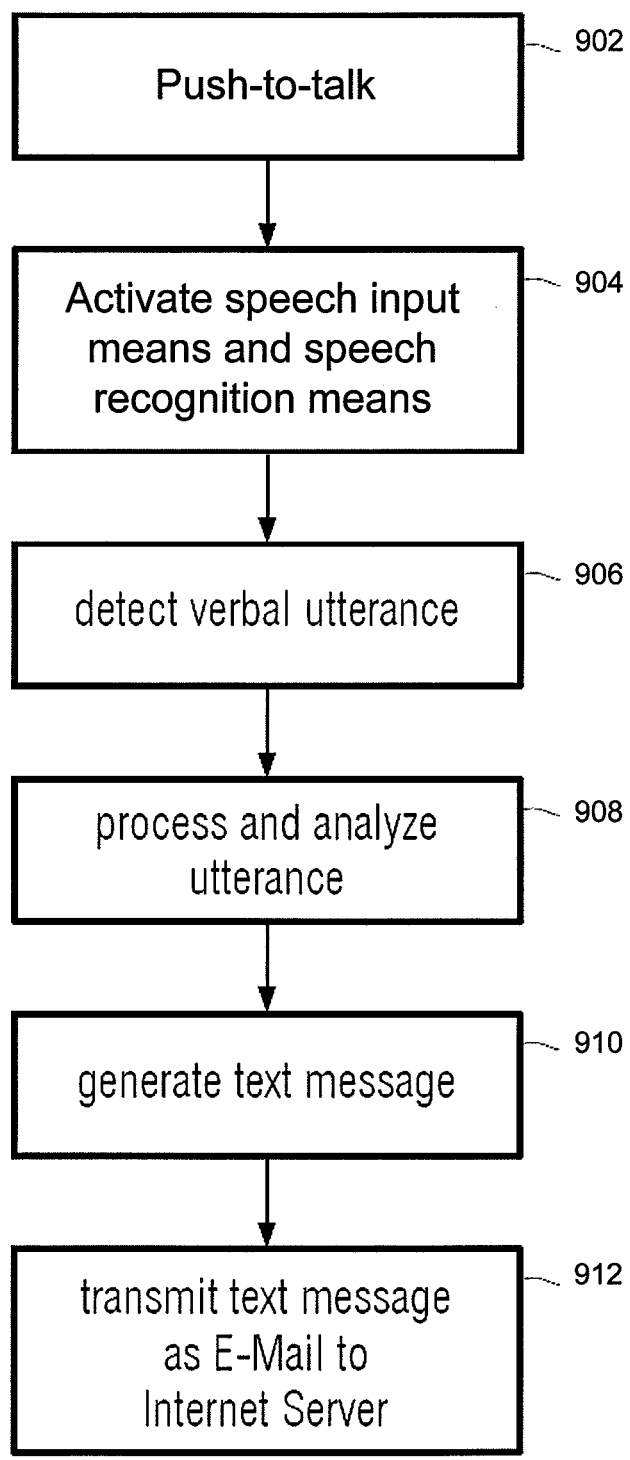
FIG. 9 is a process of transmitting a message.

FIG. 9 illustrates an alternative method of transmitting a message. A vehicle may comprise a push-to-talk lever or button as in block 902 which activates or turns on the microphone 112. The push-to-talk lever may comprise one of the buttons 114 or an entry on the touchscreen 304 display 116. When the push-to-talk lever is activated in block 902, the navigation system 104 prepares to receive a speech signal from the user.

At block 904, the speech input means and the speech recognition means are activated. The speech input means (input 202) may comprise at least one microphone 112 for receiving the speech signal. The speech recognition means includes the speech recognizer 204 which receives and recognizes the speech signal. When the speech input means is activated, the navigation system 104 may be in a stand-by mode, e.g., the microphone and the speech input means are active, but awaiting the speech input. The speech input means may recognize a keyword to activate the speech recognition means without a recognizing process. The keyword may be chosen to be distinct and the digital data representation thereof may be permanently stored in the main memory of the navigation device 104.

In one example, a message may be introduced through a spoken keyword which activates the input, such as "SMS," which notifies the navigation system 104 that the user would like to create a SMS message. Alternatively, the user may wish to send an email to a remote communication party. The user may instruct the navigation system 104 to generate an email by utterance of a corresponding keyword, e.g., "email" or by manual operation, e.g., pushing a particular button 114.

At block 906, the verbal utterance (speech signal) is detected by the navigation system 104. In particular, the microphone(s) 112 receives the speech signal which generates the text of the message. If the user wishes to generate and transmit an email, the user gives the instruction "email." In response, a synthetic speech output "Text for the E-Mail" may be heard from the speakers 110. The user subsequently dictates the text for the email as in block 906. The user may end the text through a keyword, such as "end of email." In response to the keyword, the user may be asked who the recipient or addressee of the email is.

The detected verbal utterance is processed and analyzed to obtain digitized and analyzed signals useful for the recognition process as in block 908. The speech input is processed by digitizing the microphone signal obtained at the microphone(s) 112. The digital speech signal is analyzed by the speech recognizer 204 to recognize the text of the digital speech signal. Many variants of the recognition process are known in the art and may be applied in the present system. In particular, the analysis may comprise a determination of the spectral envelope and short-time power of the speech signal.

A message corresponding to the detected verbal utterance is generated by the message generator 208 as in block 910. The analysis and recognition of the digital speech signal may be performed by the comparator 406 with a lookup table including character string representations of a digitized speech signal stored in the speech database 206.

After the message has been generated, the message may be transmitted to a recipient/addressee. For example, an email with the text dictated by the user including the addressee may be transmitted to an Internet Server as in block 912. The message is then transmitted to the addressee over the Internet Server. The email address of the recipient may be stored in a database, such as the multimedia database 210, of the navigation system 104 for future reference.

Figure 10:
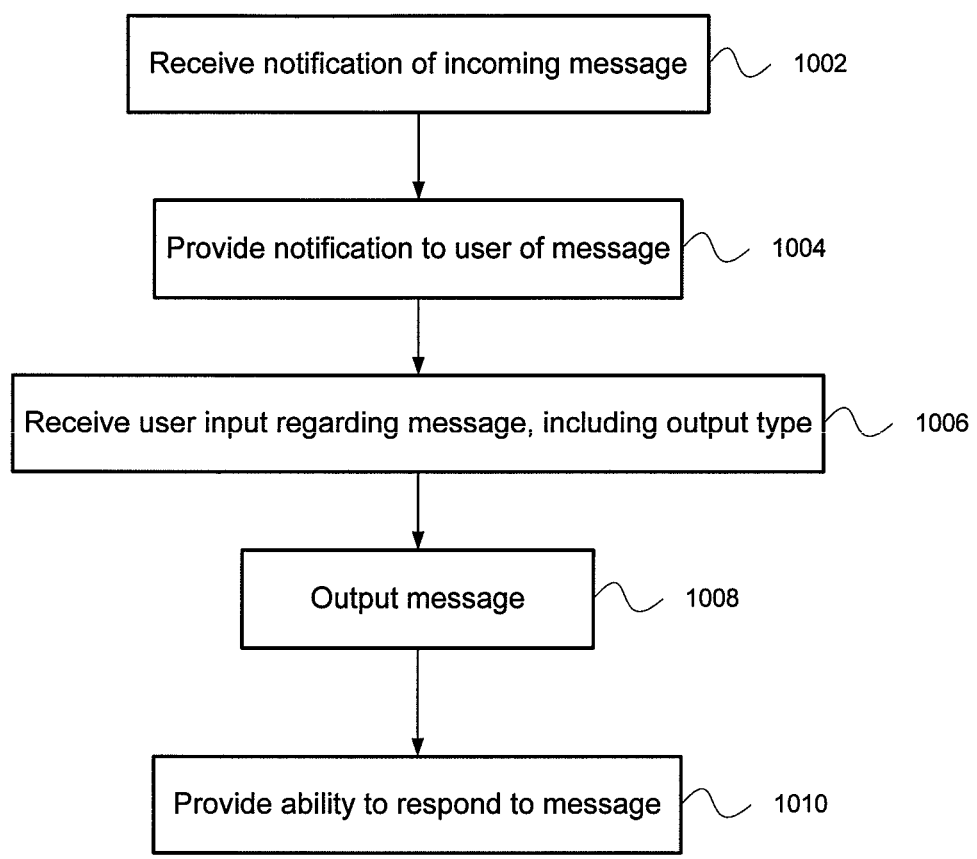
FIG. 10 is a process of receiving a message.

FIG. 10 is a flow chart illustrating the receipt of a message by the navigation system 104. In particular, the navigation system 104 may be associated with a particular address (such as an email address) or a particular phone number (such as a cellular phone number) for receiving either email messages, or SMS/EMS/MMS messages. At block 1002, an incoming message is received at the navigation system 104 and a notification is given to the user (driver and/or passengers) of the vehicle as in block 1004. In particular, the transmitter/receiver 216 may receive an incoming message from the radio unit 102 or the telecom unit 106. The received message is then provided to the user at the message output 214 as in block 1004. For example, the navigation system 104 may provide a sound, such as a ring tone or a statement "you have a message," which indicates the arrival of a message.

The user may then provide the navigation system 104 with instructions on what to do with the message as in block 1006. For example, the user may select a button corresponding with saving the message, deleting the message, displaying the message, or reading the message. Alternatively, the user may give a verbal instruction, such as "read message," and the text of the message will be transformed into sound which is played over the speakers 110 as in block 1008. The message may be displayed or audibly read by the message output 214 unit as in block 1008. In response to the message, the user may be given the option to respond or reply to the message in block 1010. The user may give a verbal instruction, such as "reply" or "respond" by which a reply message (addressed to the sender of the received message) is generated as discussed with respect to FIG. 8 or FIG. 9.

The methods discussed above may be encoded in a signal bearing medium, a computer readable medium such as a memory, programmed within a device such as one or more integrated circuits, one or more processors or processed by a controller or a computer. If the methods are performed by software, the software may reside in a memory resident to or interfaced to a storage device, synchronizer, a communication interface, or non-volatile or volatile memory in communication with a transmitter, which may include a circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," and/or "signal-bearing medium" may comprise any device that contains, stores, communicates, or transports software for use by or in connection with. an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or "electronic" connection having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A vehicle navigation system that generates an outgoing text message comprising:
a vehicle interface that permits a user to provide input to and receive output from the vehicle navigation system, the vehicle interface including an input configured to (i) receive a speech signal from a vehicle mounted microphone, wherein the speech signal corresponds to the outgoing text message, and to (ii) receive data from an incoming text message to annunciate the data to a vehicle occupant;
a speech recognizer in communication with the input and configured to analyze the speech signal and recognize text of the speech signal;
a speech database in communication with the speech recognizer that provides the speech recognizer with samples of recognized digital speech for recognizing the text of the speech signal;
a message generator in communication with the speech recognizer that generates the outgoing text message based on the text of the speech signal recognized by the speech recognizer;
an output in communication with the message generator that presents the outgoing text message on a display for verification;
a validation means that prompts a user to confirm the displayed outgoing text message;
a transmitter in communication with the message generator and configured to transmit the outgoing text message over a network upon receipt of the verification;
a receiver that receives the incoming text message and provides the incoming text message;
where the vehicle interface permits the user to selectively provide the speech signal in complete sentences, word-by-word and letter-by-letter;
where the speech database stores samples of spoken letters, words and phrases;
where the speech recognizer comprises functionality for interpreting one or more system commands, editing commands and messages and can be activated with a spoken keyword; and further comprises at least one of the following algorithms: a utilization of probability estimates, an analysis of feature vectors and a concatenation of allophones that constitute a linguistic word; and
where the transmitter comprises one or more telecommunication units that can selectively communicate the outgoing text message over a store and forward messaging service or as an electronic mail over at least one of the following paths (i) a local area network, (ii) a wireless fidelity network (Wi-Fi), (iii) a wide area network (WAN), (iv) the Internet, (v) a radio network, (vi) a wireless network and (vii) a telephone network.

2. The vehicle navigation system of claim 1 where the input comprises at least one microphone embedded in a vehicle and configured to detect the speech signal and at least one of a push-to-talk button, a push-to-talk lever and a touchscreen.

3. The vehicle navigation system of claim 1 where the transmitter supports encoding the outgoing text message in at least one of the following message formats for the store and forward messaging service: a short messaging service (SMS) message, an enhanced messaging service (EMS) message, and a multimedia messaging service message (MMS); where the network is configured to transmit at least one of the SMS message, the EMS message, and the MMS message.

4. The vehicle navigation system of claim 1 further comprising the receiver in communication with the network for receiving communications, where the communications are presented by the output.

5. The vehicle navigation system of claim 1 where the speech recognizer further comprises:
a second receiver configured to receive the speech signal;
a parser in communication with the second receiver and configured to parse the speech signal; and
a comparator that processes words based on stored sounds or phonics rather than entire words in communication with the parser and in communication with the speech database and configured to compare the parsed speech signal with the samples of recognized digital speech for recognizing the text of the speech signal.

6. The vehicle navigation system of claim 5 where the parser parses the speech signal by a letter-by-letter basis, a word-by-word basis, or a sentence-by-sentence basis.

7. The vehicle navigation system of claim 1 where the speech signal comprises a recipient for the outgoing text message, further where the text message is transmitted to the recipient over the network.

8. The vehicle navigation system of claim 1 further comprising a multimedia database in communication with the message generator that provides at least one of an image, audio, or video to be included with the outgoing text message.

9. The vehicle navigation system of claim 8 where the at least one of an image, audio, or video is attached to the outgoing text message or embedded within the outgoing text message.

10. A method for transmitting a text message with a navigation system comprising:
providing a vehicle interface for permitting a user to provide input to and receive output from a vehicle navigation system;
activating an input for receiving a speech signal from a vehicle mounted microphone via the vehicle interface;
detecting the speech signal by the input;
using a processor for recognizing the speech signal by comparing the speech signal with sample signals stored in a speech database;
generating the text message comprising text from the recognized speech signal;
outputting the text message for verification, the outputting including displaying at least part of the text message on a display and prompting a user of the navigation system to acknowledge the text message displayed on the display;
transmitting the text message upon verification;
where the recognizing further comprises processing the speech signal in complete sentences, word-by-word and letter-by-letter, as selected by the user;
where the comparing further comprises the use of one or more of the following algorithms: a utilization of probability estimates, an analysis of feature vectors and a concatenation of allophones that constitute a linguistic word; and
where the transmitting further comprises selectively sending the text message over a store and forward messaging service or as an electronic mail over at least one of the following paths: a local area network, a wireless fidelity network (Wi-Fi), a wide area network (WAN), the Internet, a radio network, a wireless network and a telephone network.

11. The method of claim 10 where the recognizing further comprises:
evaluating the recognized speech signal by a score; and
repeating the recognizing of the speech signal on another one of the letter-by-letter basis, the word-by-word basis, and the sentence-by-sentence basis when the score falls below a predetermined threshold.

12. The method of claim 10 where the step of detecting the speech signal includes the step of receiving the speech signal from a microphone embedded in the vehicle.

13. The method of claim 12 where the detecting comprises detecting an audio output from a user with the microphone and digitizing the audio output into the speech signal.

14. The method of claim 10 where the text message is transmitted by the navigation system in response to a predetermined input from the user in response to the displayed text message.

15. The method of claim 10 further comprising:
providing navigation directions; and
displaying a map including the navigation directions.

16. The method of claim 10 where the transmitting of the text message further comprises encoding as a short messaging service (SMS) message, an enhanced messaging service (EMS) message, or a multimedia messaging service (MMS) message, where the network is configured to transmit at least one of the SMS, EMS or MMS messages.

* * * * *